Patented Sept. 7, 1948

2,448,524

UNITED STATES PATENT OFFICE 2,448,524

COATED GRANULAR RESIN AND PROCESS OF MAKING SAME

Edmund John Gentner, Niagara Falls, N. Y., assignor to E. I. du Pont de Nemours & Company, Wilmington, Del., a corporation of Delaware No Drawing. Application November 7, 1947, Serial No. 784,752

8 Claims. (Cl. 117—100)

This invention relates to the production of polyvinyl resins in granular form and more particularly to a means for lubricating the granules.

Thermoplastic vinyl resins such as polyvinyl acetate may be produced in granular form by various methods. One form is "bead" polyvinyl acetate, consisting of smooth spherical particles which may be made in various sizes. Another form consists of small particles of irregular shape. Such granular material is convenient to handle in various operations such as measuring and dissolving. However, since polyvinyl acetate is thermoplastic and exhibits considerable cold flow at ordinary temperatures, it often is necessary to refrigerate this material during storage to prevent coalescence of the particles to large masses which are then difficult to dissolve. Such refrigeration is costly and undesirable.

It has been found advantageous to prepare beads or granules of polyvinyl acetate by polymerizing the monomer dispersed in water containing a small amount of surface active compound as a dispersing agent. These beads can be prepared with a high degree of uniformity which is of considerable importance in solution operations.

The wet beads obtained, after polymerization generally are centrifuged to remove a large proportion of the external water and are then dried with warm air. In order to dry the beads at a reasonable rate, it is necessary to use a drying temperature of 40°–80° C. Under these conditions, unlubricated beads will agglomerate to form large lumps. The dried beads will also agglomerate on storage at ordinary temperatures in the absence of a lubricant.

The problem of agglomeration is not confined to polyvinyl acetate but occurs likewise with polymers of other vinyl esters of carboxylic acids and copolymers of such vinyl esters, which have thermoplastic properties similar to those of polyvinyl acetate. Such thermoplastic properties are generally shared by the various polymers of esters of carboxylic acids, for example, polymers of vinyl formate, propionate, benzoate, naphthoate and stearate. The thermoplastic properties of vinyl ester copolymers depend upon the proportion of the vinyl ester in the copolymer, the nature of the copolymerized constitutent or constituents and the degree of polymerization. Generally, those copolymers of vinyl acetate or other vinyl ester in which the vinyl ester is the preponderant constituent have thermoplastic properties which tend to cause agglomeration of granules. For example, copolymers of vinyl acetate with vinyl chloride containing upwards of 80% by weight of the acetate generally are sufficiently thermoplastic to cause agglomeration during storage.

For plant practice, wherein the wet granules are fed into a rotary drier, a lubricant is desired which will (1) lubricate the wet beads so that the mass will freely flow through pipes, chutes or like means for gravity transfer to the drier, (2) prevent the granules from sticking to one another or to the surfaces of the drier during the drying operation, (3) lubricate the dried beads, to impart good free-flowing characteristics to the dried product and (4) prevent sticking or agglomeration of the granules during storage or shipment.

Fatty substances such as high molecular weight alcohols and high molecular weight fatty acids and their salts (Marks, U. S. P. 2,245,040) and sebacic acid (Lemanski 2,317,149), are effective lubricants for granular, thermoplastic vinyl resins, but do not have all of the above qualities to the extent desired for best commercial operation.

An object of the present invention is to provide an improved lubricant for granular thermoplastic polymers and copolymers of vinyl acetate and other vinyl carboxylates. Another object is an improvement in the process of drying such granular polymers and copolymers. A further object is to prevent the granules of such polymers and copolymers from sticking, one to another, and to the surfaces of equipment in drying, storing and shipping. Another object is to improve the free-flowing characteristics of such granular vinyl resins, in both the wet and dry states. Other objects will be apparent from the ensuing description.

The above objects may be attained in accordance with the present invention by coating the surfaces of the granules with disodium adipate, dipotassium adipate, or other di-alkali metal salts of adipic acid. While any of the alkali metal salts of adipic acid may be used, I prefer disodium adipate, which generally is the cheapest and most readily available.

While the free acid, adipic acid, has lubricating properties, I have found that superior results are obtained with its di-alkali metal salts, e. g., disodium adipate. The salt permits the use of higher drying temperatures and imparts better flowing properties to the dried granules than does the free acid.

The lubricating qualities of the di-alkali metal adipate may be enhanced by mixing with it 5 to 30% by weight (preferably about 10%) of an alkali metal salt of a high molecular weight, alcohol sulfate, i. e., a product made by reacting sulfuric acid with an alcohol, or mixture of alcohols, having not less than 8 carbon atoms, followed by neutralizing with an alkali, e. g., sodium or potassium hydroxide or other alkaline compound of one of the alkali metals. These sulfated alcohol salts are commonly sold under various trade names as detergents and dispersants. A preferred example is sodium lauryl sulfate.

*Example*

A quantity of granular polyvinyl acetate was prepared by polymerizing vinyl acetate dispersed in water, the granules were coated with lubricant by adding the dry lubricant to the mass of wet granules and stirring. The flowing characteristics of the lubricated wet granules was observed and then the granules were dried in a small rotary drier. The drier was heated by applying heat externally, while air at room temperature was passed through it. The drying temperature (temperature of heating liquid applied to the drier periphery) was rapidly increased from 60° C. to 95–100° C. and the temperature was noted at which the first evidence of granules sticking to one another or to drier walls was observed. The flow characteristics of the dried material was observed. In separate operations using as lubricants (1) adipic acid, (2) disodium adipate and (3) a mixture of disodium adipate and a commercial sulfated alcohol product consisting chiefly of sodium lauryl sulfate, the following results were obtained:

| Trial | Lubricant | Percent [1] | Initial (Wet) Flow | Dry Flow | Max. Temp. with no sticking of beads during drying °C. |
|---|---|---|---|---|---|
| A | Adipic Acid | 0.60 | Good | Poor | 64 |
| B | Disodium Adipate | 0.60 | Fair | Good | 87 |
| C | Disodium Adipate / Sulfated alcohol | 0.54 / 0.06 | Very Good | Very Good | 94 |

[1] Percent by weight of the lubricant in its admixture with the polyvinyl acetate granules.

Samples of the dried beads lubricated with disodium adipate and with the mixture of disodium adipate and the sulfated alcohol from the above operations were separately heated to 109° C. for 24 hours with no evidence of sintering or discoloration.

The above operations were repeated, except that the granules were lubricated by mixing with aqueous solutions of the lubricants. The results were substantially identical with those set forth above.

The adipate lubricant may be applied to the granular vinyl resin in any desired manner, so as to coat the surfaces of the granules therewith, and relatively small amounts are required. The amount required will vary, depending on the state of subdivision of the granular resin, as the amount of surface to be coated varies inversely with granule size. Generally less than 1.0% of the dry weight of the lubricant will suffice and in most cases about 0.4 to 0.6% gives good results. For large-size vinyl resin beads or particles, e. g. 0.1 to 0.3 inch in diameter, still smaller amounts of lubricant, e. g. as low as 0.1% by weight, can be used. The above percentages are all based on the dry weight of the vinyl resin.

In a preferred embodiment of the invention, the lubricant is a mixture of the adipate and a sulfated alcohol salt having from 8 to about 18 carbon atoms. The amount of the sulfated alcohol may vary from about 5 to 30% of the weight of the adipate, preferably in the neighborhood of 10%. It may be premixed with the adipate or the adipate and the sulfated alcohol may be added separately to the granular vinyl resin. Suitable salts of sulfated alcohols are well known articles of commerce made by reacting saturated or unsaturated higher alcohols, or mixtures thereof, with sulfuric acid and neutralizing with alkali; and are commonly used as wetting agents, detergents and dispersants.

Various means for coating the vinyl resin particles with the lubricant may be used, and any conventional method which will produce the coating is satisfactory. The vinyl resin particles may be either dry, or wet with water or other non-solvent, when the lubricant is applied. A convenient and preferred method is to mix the granular vinyl resin with finely powdered disodium adipate, e. g. about 50 to 100 mesh size. Another method is to add the adipate in aqueous solution.

The wet, lubricated vinyl resin granules may be dried at a temperature of 40 to 100° C. in a rotary dryer or other conventional drying equipment, preferably tumbling or stirring the material while drying. The initial temperature in the dryer may vary from 40 to 60° C. without undue sticking. As the drying operation proceeds, the temperature can be raised, to finish at 60 to 100° C., substantially without sticking. Generally a maximum drying temperature not exceeding about 100° C. is satisfactory; but the maximum drying temperature will vary, depending on the specific kind and grade of vinyl resin. The resulting dried granular material is free-flowing, substantially free of lumps or other agglomerations and may be stored under ordinary storage and shipping conditions for long periods of time, substantially without agglomeration or adherence of the granules.

I claim:

1. The process which comprises mixing granular vinyl carboxylate polymer, wet with water, with an amount of dialkali metal adipate equal to about 0.1 to 1% of the dry weight of said polymer and subsequently drying said polymer.

2. The process which comprises mixing granular vinyl carboxylate polymer, wet with water, with an amount of dialkali metal adipate equal to about 0.1 to 1% of the dry weight of said polymer and a quantity of a sulfated alcohol alkali metal salt having 8 to about 18 carbon atoms equal to 5 to 30% of the weight of said adipate and subsequently drying said polymer.

3. The process which comprises mixing granular polyvinyl acetate wet with water, with an amount of dialkali metal adipate equal to about 0.1 to 1% of the dry weight of said polymer and a quantity of a sulfated alcohol alkali metal salt having 8 to about 18 carbon atoms equal to 5 to 30% of the weight of said adipate and subsequently drying said polymer.

4. The process which comprises mixing granular polyvinyl acetate wet with water, with an amount of dialkali metal adipate equal to about 0.1 to 1% of the dry weight of said polymer and a quantity of a sulfated alcohol alkali metal salt having 8 to about 18 carbon atoms equal to 5 to 30% of the weight of said adipate and subsequently drying said polymer at a temperature of about 40 to 100° C.

5. As a new composition of matter, granular, thermoplastic polymerized vinyl carboxylate having individual granules thereof coated with an amount of dialkali metal adipate equal to about 0.1 to 1% of the dry weight of the polymer.

6. As a new composition of matter, granular thermoplastic polymerized vinyl carboxylate having individual granules thereof coated with an amount of di-alkali metal adipate equal to about 0.1 to 1% of the dry weight of the polymer and an amount of a sulfated alcohol alkali metal salt containing 8 to about 18 carbon atoms equal to about 5 to 30% of the weight of said adipate.

7. As a new composition of matter, granular, thermoplastic polyvinyl acetate having individual granules thereof coated with an amount of di-alkali metal adipate equal to about 0.1 to 1% of the dry weight of the polymer.

8. As a new composition of matter, granular, thermoplastic polyvinyl acetate having individual granules thereof coated with an amount of di-alkali metal adipate equal to about 0.1 to 1% of the dry weight of the polymer and an amount of a sulfated alcohol alkali metal salt containing 8 to about 18 carbon atoms equal to about 5 to 30% of the weight of said adipate.

EDMUND JOHN GENTNER.